Patented Oct. 1, 1940

2,216,132

UNITED STATES PATENT OFFICE 2,216,132

PROCESS FOR THE PRODUCTION OR RECOVERY OF UNITARY POLYNUCLEAR CARBON COMPOUNDS

Mathias Pier and Karl Schoenemann, Heidelberg, Germany, assignors to I. G. Farbenindustrie Aktiengesellschaft, Frankfort-on-the-Main, Germany No Drawing. Original application November 2, 1934, Serial No. 751,251. Divided and this application December 15, 1938, Serial No. 245,918. In Germany November 23, 1933

19 Claims. (Cl. 260—668)

The present invention relates to the production or recovery of unitary polynuclear carbon compounds of high molecular weight, not only such as contain at least four rings in the molecule, but also such as contain less than four rings. As examples of the said compounds, which may belong to the isocyclic or to the heterocyclic group, may be mentioned alkyl-naphthalenes, naphthol-fluorenes, triphenylene, anthracene, alkyl-anthracenes, acenaphthene, retene, pyrene, chrysene, picene, fluorene, fluoranthene, truxene, naphthanthracene, naphthacene, decacyclene, diphenylene sulphide, diphenylene oxide, brasane, carbazole, phenylnaphthyl-carbazole, acridine and other ring systems, in part still higher condensed ring systems, as well as their homologues and hydrides which in pure form are valuable as initial materials for organic syntheses.

The industrial recovery of such polynuclear carbon compounds has hitherto, apart from the synthetic preparation, been restricted to the isolation of these substances from mineral coal high temperature tar, the only crude material in which they are present in sufficient amounts and from which they are comparatively readily recoverable. The processes hitherto known are based on the splitting up of the mixture of substances present in the mineral coal tar into several fractions and unitary products by distillation, crystallization, selective dissolution or other physical methods or by chemical methods, as for example treatment with sulphuric acid or fusion with caustic potash. Insofar as compounds having three nuclei are concerned, the isolation of the pure substances is comparatively simple and has been carried out rather economically on an industrial scale for years. The recovery of compounds of higher molecular weight containing 4 or more rings is attended by considerable difficulties, however.

In products, other than mineral coal high temperature tar, obtained by purely thermal treatment of bituminous substances, the said polynuclear compounds are present only in such very small amounts that their isolation, if it is possible at all, is still more troublesome and expensive.

We have now found that carbon compounds of high molecular weight of the said kind can be prepared in a simple and inexpensive manner and in large amounts by a process utilizing the known destructive hydrogenation of bituminous crude substances.

It may be well to point out here that, whenever in this specification we simply speak of "destructive hydrogenation," we wish this expression to be understood in a broad sense, including not only a treatment with hydrogenating gases under conditions resulting in a more or less drastic breaking down of the molecules of the initial materials, but also under conditions under which mainly a hydrogenation takes place or under which only some of the constituents of the initial materials are considerably attacked or degraded, others being left unaltered or substantially unaltered.

We have found that the destructive hydrogenation of bituminous crude materials results in the formation of substantial amounts of high molecular cyclic carbon compounds, either as such or in the form of their hydro derivatives, and that consequently the destructive hydrogenation products of high boiling point of bituminous crude materials contain very considerable amounts of such compounds and that these may be recovered therefrom very readily and simply, for example, by the methods which have hitherto been employed for recovering compounds of the said kind from mineral coal high temperature tar.

Further investigations have revealed the fact that not only the bituminous materials which have hitherto been relied upon for the recovery of the valuable polynuclear compounds or which have hitherto mainly been employed as initial materials for destructive hydrogenation processes, are suitable for the purpose here in question, but that compounds of the said kind can also be obtained in a simple manner by subjecting recent or fossil resins or balsams or substances containing the same to a destructive hydrogenation, under moderate conditions, preferably with only slight splitting, the desired compounds being separated from the fractions of high boiling point of the resulting destructive hydrogenation products, after these have been subjected to a dehydrogenation.

As has been pointed out above, we have found that polynuclear compounds containing at least four rings are present in destructive hydrogenation products and may be recovered therefrom very readily and simply. More particularly, such compounds may be produced with great advantage from bituminous substances other than mineral coal high temperature tar. As suitable initial materials for this purpose may be mentioned for example mineral coal, brown coal, peat, wood, lignin, oil shale, mineral oils, natural asphalt, mineral coal and brown coal low temperature tars as well as fractions and extracts, distillation, cracking and refining residues thereof.

The destructive hydrogenation of the bituminous substances may be carried out according to known methods, as set forth, for example, in U. S. Patent 1,690,434. Thus the temperatures will usually range between about 300° and about 700° C. and the pressure above 20 atmospheres, preferably at at least 50 atmospheres. Preferably, the pressures used are much higher, as for example 100 or 200 or even 1000 atmospheres or still more. The reaction is preferably effected while employing the known destructive hydrogenation catalysts, such as shown in U. S. Patent 1,890,438.

While the constituents of high boiling point of the destructive hydrogenation products, obtained while splitting to benzine, may be used for the process, it is understood that the reaction conditions are preferably selected to give a maximum yield of substances of high boiling point and high molecular weight. For example, in the case of mineral coal a hydrogen pressure of 200 atmospheres or more, a reaction temperature of usually not more than from 380° to 500° C., a time during which the reacting materials are within the reaction chamber of from 10 to 90 minutes and the use of catalysts are advantageous. The coal may be finely ground and advantageously freed from the gangue and the basic constituents, which may be effected by treatment with acid-reacting agents, as for example hydrochloric acid. The catalysts are advantageously added dissolved in water or organic solvents. They may also be incorporated with the initial materials in a solid form, if desired, applied to carriers. The coal thus pretreated is then made into a paste with oil and subjected to destructive hydrogenation. By suitable selection of the temperature, as for example from 440° to 470° C., and the throughput, as for example 0.5 kilogram of coal per liter of reaction space per hour, the reaction can readily be so carried out that the resulting product consists mainly of constituents of high boiling point.

When it is desired to obtain destructive hydrogenation products which are particularly rich in hydrogen, the destructive hydrogenation is preferably carried out under such conditions of temperature, pressure and time of reaction and in the presence of suitable catalysts, as, for example, tungsten, molybdenum, chromium, zinc and tin, or their oxides or sulphides, that at the most a slight splitting but the greatest possible addition of hydrogen to the aromatic compounds is produced; thus not too high temperatures, in most cases not more than 470° C., and the highest possible partial pressure of hydrogen, preferably more than 150 atmospheres, should be employed.

When oils substantially free from hard asphalt are to be treated by destructive hydrogenation mainly under hydrogenation conditions so that no splitting to products of low boiling point, or in any case no considerable splitting to such products takes place, it is advantageous to work at comparatively low temperatures, usually between about 200° and 500°, and preferably between 250° and 450° C., and in the presence of of large amounts of catalysts, preferably such as have mainly a hydrogenating action and but a slight splitting action, especially of the 4th to the 8th groups, of the periodic system, such as molybdenum, chromium, tungsten and vanadium and especially their compounds, such as oxides, sulphides or halides. For the same reason it is frequently preferable to employ the catalysts while arranged rigidly in the reaction chamber. The catalytic substances may be precipitated on carriers, such as active carbon, active silica or brown coal low temperature coke which has been freed from ash or neutralized, i. e. treated with acid. The catalysts are preferably employed in a shaped condition, such as pellets, tablets or cubes. The period during which the reaction materials are in contact with the catalyst at the reaction temperature is so selected that the hydrogenation takes place without appreciable splitting to products of low boiling point. The treatment effects mainly the reduction of the phenols, sulphur compounds and bases and the hydrogenation of the unsaturated or aromatic compounds.

For the preparation or recovery of polynuclear compounds containing side chains in the molecule mineral coal may be finely ground and advantageously freed from the gangue and the basic constituents of the ash as explained above. The coal is then mixed with finely ground catalytic substance or impregnated with a solution of the latter. The amount of catalyst is preferably from 0.05 to 5 per cent and is so correlated with the hydrogenation conditions that the heavy oil leaving the reaction chamber contains less than 5 per cent of asphalt. The coal thus pretreated is then made into a paste with oil, preferably derived from the same coal, and subjected to destructive hydrogenation. The addition of catalyst may also be made after the coal is made into a paste; catalyst may also be added in batches in different phases of the process. Furthermore, different catalysts may be employed. Thus, for example, a coal which has been provided with a molybdenum or tin compound may have added thereto after heating up a halogen or sulphur compound, as for example carbon tetrachloride or carbon disulphide. The reaction temperature is advantageously between 400° and 440° C. The amount to be passed through the reaction chamber is kept so low that the gasification amounts to less than 13 per cent, calculated with reference to the oil and gaseous constituents formed from the coal, and the degradation of the coal substance preferably to more than 90 per cent. This amount reckoned per hour is preferably between 0.05 and 0.3 kilogram of coal paste (consisting of 1 part of coal and 1 part of oil) per liter of reaction space. The coal paste heated to the reaction temperature is led through the reaction chamber and the resulting product is led into a separator in which a level of liquid is maintained. The temperature in this vessel is kept at only about 5° to 30° C. below the reaction temperature so that all heavy oil freshly formed from the coal passes in the vapor phase together with the hydrogen into an adjacent vessel. The product distilling over into the latter consists of from 30 to 50 per cent of constituents boiling up to 325° C. and from 70 to 50 per cent of heavy oil, which latter is free from asphalt and solid constituents.

When it is desired to employ as initial materials recent or fossil resins or balsams or substances containing the same, use may be made, for example, of turpentine, shellac, wood oil, copals, and amber resins and the products resulting in the working up of these substances or also waste products, as for example colophony and resin oils from turpentine or colophony pitch.

In order to recover those constituents of the resinous initial material which are difficult to hydrogenate or their slightly changed basic substances, the reaction conditions during the destructive hydrogenation are so selected that the aromatic compounds to be recovered are changed as little as possible while the accompanying substances are converted to a large extent into low molecular and therefore readily separable or readily soluble products. This may be effected, for example, by the use of the highest possible temperatures, as for example from about 430° to 600° C., and the lowest possible partial pressure of hydrogen, as for example from about 20 to 100 atmospheres, when the total pressure amounts, for example, to between 200 and 500 atmospheres. The desired cyclic compounds are then contained in the hydrogenation product usually in a non-hydrogenated state as purely aromatic compounds and are therefore present in a readily crystallizable form.

If, on the other hand, it is desired to recover the readily hydrogenizable constituents of the resinous initial materials or their basic substances, it is advantageous to employ the lowest possible temperature, as for example from about 180° to 450° C., and the highest possible pressure of hydrogen, as for example from about 150 to 600 atmospheres, during the destructive hydrogenation. The aromatic compounds are thus converted into their hydro derivatives.

Depending on the conditions during the destructive hydrogenation of the resinous substances, more or less far-reaching conversion of the molecules may take place. For example, it is possible to reduce the carboxylic groups in the polymerized abietic acid in colophony by working at from about 230° to 300° C. in the presence of suitable catalysts, as for example copper and manganese; at about 350° C. and in the presence of iron or aluminum oxide, the carboxylic groups are completely split off, at still higher temperatures the isopropyl groups are also split off and at 500° C. under a pressure of 150 atmospheres of hdyrogen and in the presence of nickel catalysts homologues of naphthalene are formed by the splitting of a ring. All the degradation products may be obtained in a non-hydrogenated or in a more or less hydrogenated condition.

A valuable method or step employed in the recovery of the valuable polynuclear compounds consists in dehydrogenation. In the destructive hydrogenation, the cyclic compounds to be recovered are often converted into the corresponding hydro compounds the boiling point of which usually lies about from 20° to 90° C. or more lower than those of the non-hydrogenated compounds originally present in the initial materials; for example anthracene boils at about 360° C. while perhydroanthracene, i. e. tetradecahydroanthracene, boils at about 275° C., and chrysene boils at about 448° C. while perhydrochrysene boils at about 360° C. Furthermore, the constituents of the initial materials which before the treatment are non-distillable and readily coked, as for example asphaltic substances of tars or humic substances of coals, are at the same time considerably degraded by the destructive hydrogenation so that in some cases, depending on the reaction conditions, they even yield an additional amount of valuable polynuclear compounds. By the lowering of the boiling point and by the removal of the asphaltic substances, the ring compounds of high molecular weight are distillable without decomposition.

By the dehydrogenation, the hydro compounds are converted or reconverted into the corresponding less hydrogenated, as for example purely aromatic, compounds, which have by nature a high melting point and pronounced crystallizing power and which are readily split up by fractional crystallization into the desired pure substances. The yield of cyclic compounds may be still further increased in some cases by carrying out the dehydrogenation under such strong conditions that side chains present on the aromatic nucleus are split off.

One method for dehydrogenation consists in heating the materials to be treated to temperatures of from 400° to 700°, especially from 400° to 600° C., preferably while employing catalysts. If it is desired to split off any side chains present, the destructive hydrogenation product is preferably heated to temperatures of from 500° to 1000°, advantageously from 550° to 700° C.

As catalysts may be mentioned silver or metals of the 2nd to 8th groups of the periodic system, as for example magnesium, zinc, aluminum, silicon, titanium, tin, lead, vanadium, chromium, molybdenum, tungsten, uranium, manganese, iron, nickel, cobalt, or rare earth metals, preferably in the form of their compounds, as for example oxides, sulphides, phosphates or halides, or mixtures of such substances. These catalysts may be applied to carriers, as for example active carbon, activated brown coal small coke which has preferably been de-ashed or neutralized with acid, active silica, magnesia or bleaching earths. The dehydrogenation may be carried out in the presence of hydrogen under a total pressure for example of from 5 to 200 atmospheres or more. It is advantageous to employ a partial pressure of hydrogen of less than 50 atmospheres, when the total pressure is 200 atmospheres. Other gases or vapors, as for example water vapor, nitrogen, carbon monoxide or methane, or gas mixture, as for example water gas, may also be present. Especially valuable results are often obtained by working in the presence of carbon dioxide. For dehydrogenations in the presence of hydrogen, the oxides or sulphides of metals from the 5th and 6th groups of the periodic system, if desired in admixture with other metal compounds, are especially valuable as catalysts.

When it is desired to increase the yield or cyclic hydrocarbons by splitting off side chains which may be present, the procedure may be that a dehydrogenation is carried out first at comparatively elevated temperature, as for example from 350° to 550° C., advantageously in the presence of catalysts, as for example vanadium, chromium, silicon, molybdenum, tungsten, or nickel or especially their compounds, no splitting off or only an incomplete splitting off of the side chains thus occurring, the resulting products or fractions of the same being then treated with such substances as for example aluminum chloride, boron fluoride, iron chloride, or titanium chloride, if desired with an addition of hydrochloric acid, at temperatures of from 50° to 300° C., advantageously from 80° to 200° C. In this manner a splitting off of the side chains from the cyclic nuclei takes place. This may also be effected by treating the dehydrogenated product with potassium permanganate, chromic acid or other oxidizing agents at temperatures of from 80° to 150° C.

The splitting off of the side chains by means of the said action of chlorides or by oxidation may, however, be carried out before the dehydrogenation proper, which in this case may be carried out under milder, non-splitting conditions, especially at comparatively low temperatures and with a short time of contact with the catalyst.

In many cases the recovery of polynuclear compounds of high molecular weight, in particular the splitting up of the dehydrogenation products into unitary pure substances, is facilitated by carrying out the dehydrogenation of the destructive hydrogenation products of the bituminous substances in stages.

Troubles in the dehydrogenation may be avoided by employing the catalysts in a finely divided state and leading them through the reaction vessel together with the products to be treated.

In carrying out the catalytic dehydrogenation it has been observed that in some cases the dehydrogenation only takes place partially and that the hydro derivatives of the desired compounds which are still present may act to hinder the separation of the compounds of high molecular weight, especially the polynuclear compounds. To avoid this, the dehydrogenation may be carried out under reduced pressure. Generally speaking the maximum pressure is 200 millimeters, pressures of from 2 to 70 millimeters (mercury gauge) being employed for example. The temperature for the dehydrogenation according to this method is usually between 100° and 700°, advantageously between 300° and 700° C. Suitable catalysts are metals of the 3rd to the 8th groups of the periodic system or their compounds, for example molybdenum, tungsten, chromium, uranium, rhenium, manganese and vanadium or their oxides, sulphides and phosphates. It is advantageous to carry out the dehydrogenation in the presence of hydrogen which should, however, not have too high a partial pressure, for example a partial pressure of from 5 to 30 millimeters at a total pressure of 50 to 100 millimeters.

Another method whereby dehydrogenation, especially of hydrocarbons or their derivatives, especially unitary organic compounds, may be effected with good yields and without the formation of undesirable by-products, consists in working in the presence of finely divided metals or their compounds, and of acid substances, in particular acids or substances forming the same under the reaction conditions. For the catalysts there may be used in addition to those previously mentioned, copper, sodium, potassium and calcium.

Use may be made as the acid substances or substances producing acids under the reaction conditions of the halogens, as for example chlorine, bromine or iodine, or their compounds with hydrogen, carbon or ammonia, as for example carbon tetrachloride, or readily decomposable metal compounds of these halogens. Other acids, as for example sulphuric acid, nitric acid, phosphoric acid, sulphurous acid or sulphonic acids or carboxylic acids, as for example formic acid or acetic acid, may also be employed. The metal or compound acting as catalyst may be added to the initial material before or during the heating up. The acid substances may be added at elevated temperature, for example at between 50° and 200° C., and at a time when the initial material already contains the metal or metal compound. It has, however, been found to be more advantageous to add the acid substance before the commencement of the heating or during about the first half of the range of temperature through which the product is heated in order to attain the reaction temperature. In this case the metal or metal compound may be added simultaneously or, preferably, at a higher temperature, as for example during the second half of the heated period or after the heating.

The amount of these catalysts should be as small as possible and is preferably from 0.01 to 5 per cent, calculated with reference to the initial material. It is also advantageous for the amount of halogen or other acid substance to be less than the amount of the metal component.

Dehydrogenation, if desired while splitting off side chains from cyclic compounds, may also be effected by exposing the initial materials, if desired in the presence of solvents, to the action of silent electric discharges under such conditions as to temperature and duration that the formation of polymerization products is substantially avoided. When employing initial materials of high boiling point, i. e. above 350° C., it is sometimes advantageous to carry out the reaction in the presence of preferably inert solvents, as for example illuminating oil or paraffin wax, which are preferably added only in the course of the reaction. The reaction usually proceeds at a temperature of from 20° to 90° C. which should be the higher, the higher the viscosity of the initial material. The duration of the treatment is from about two to ten hours.

The dehydrogenation may also be carried out in other ways as for example by leading over copper at 350° C. while adding a measured amount of air or oxygen, or by heating for example at from 150° to 300° C. with sulphur. Agents combining with hydrogen, as for example selenium, tellurium, nitrogen oxides or dilute nitric acid, may also be employed. The dehydrogenation may also be effected by treatment with halogen directly or by halogenation and splitting off hydrogen halides, if desired while adding catalysts.

A method of treatment which is somewhat related to dehydrogenation in that a splitting off of hydrogen may take place therein, is the distillation of the destructive hydrogenation products with an addition of metals or of condensing or polymerizing agents. For this purpose, the oils are distilled at atmospheric, increased or preferably under reduced pressure. Suitable metals are those from the 1st and 2nd groups of the periodic system and of these the alkaline earth metals and especially the alkali metals are to be recommended. The employment of metals of the 8th group of the periodic system, as for example iron, is not advisable as a rule. Sodium, potassium, lithium, calcium and zinc may be mentioned as suitable metals. Aluminum chloride, zinc chloride, titanium chloride, ferric chloride, stannous chloride, or boron fluoride, if desired in admixture with substances retarding the reaction, as for example zinc oxide, may be employed for example as the condensing or polymerizing agents, which should be of the type promoting the Friedel-Crafts reaction. The metals or other agents are usually employed in rather small amounts, as for example from 0.1 to 10 per cent of the weight of the oils. The oils may also be treated prior to distillation with a small amount, as for example from 1 to 5 per cent of a condensing agent at ordinary or elevated temperature, as for example up to 150° C. In this case it is not necessary to add metals or condensing or polymerizing agents during the distillation.

It is always desirable to effect a removal of paraffin waxes, asphalts and other undesirable substances from the materials under treatment.

The separation of the paraffin wax from the destructive hydrogenation products is effected in known manner as by precipitation or solvent extraction.

A separation of asphaltic substances, by which expression we understand not only hard asphalt and pitch-forming constituents, but also soft asphalts, may be effected by filtration or centrifuging or with absorption agents or the like. However, it is generally speaking preferable to effect the removal of asphaltic substances by more efficient methods, more particularly by distillation or with the aid of selective solvents for asphalt or the oils containing the asphalt.

In distillation, care should be taken that no trace of the pitchy residue passes over because even small amounts of this substance in the distillate may injure the activity of the catalyst in a subsequent catalytic treatment, and secondly that all fractions boiling up to temperatures of 300°, if desired up to 350° C. at from 10 to 15 millimeters (mercury gauge) pass over in order to obtain the greatest possible yield of distillate.

When working with selective solvents, use may be made for example of alcohols, phenols, aniline, ketones, nitro-benzene, organic chloro-compounds, acids, esters, liquid sulphur dioxide, or hydrocarbons rich in hydrogen, such as benzines, gas oils or propane.

In the case of destructive hydrogenation products which contain solid substances, as for example undecomposed coal, inorganic constituents of the coal substance or catalysts, it is preferable to separate these substances before the separation of the asphaltic substances. With mobile hydrogenation products this may be effected for example by filtration or centrifuging and with viscous products by fractional separation of the asphalt.

The fractional precipitation of asphalt is carried out by first precipitating only the most difficultly soluble asphaltic substances by the addition of only small amounts of precipitant, by using a short time of precipitation or by using a high precipitating temperature or by using more than one of these methods in combination.

We shall now describe an isomerization of initial materials containing cyclic constituents belonging at least in part to the hydroaromatic series. In this treatment the cyclic constituents of the initial material which contain 5-membered rings and side chains attached thereto may be converted into compounds with 6-membered rings. A conversion of 6-membered rings into 5-membered rings with side chains may also take place. In most cases both types of conversion take place simultaneously so that an equilibrium is finally attained. It is also possible to convert compounds containing at the same time 5-membered rings and 6-membered rings into other compounds in which the 6-membered rings have been converted into 5-membered rings. When the initial materials do not contain hydroaromatic constituents or contain only an insufficient amount thereof, they may be subjected to a hydrogenation prior to being subjected to the isomerization.

In order to effect the isomerization especially such catalysts are used as promote the Friedel-Crafts reaction, as for example aluminum chloride, ferric chloride, titanium chloride or zinc chloride which are preferably used in the form of salts containing water of crystallization. Use may also be made as catalysts of boron fluoride or of metal oxides or sulphides, especially those of the metals of the 5th and 6th groups of the periodic system. The isomerization is effected by heating the initial materials, or more suitably fractions thereof boiling within a narrow range of temperatures or even fractions having a definite boiling point, to temperatures between 50° and 500° C., preferably between about 100° or 120° and 300° C., in the presence of these catalysts, if desired in the presence of gases as for example hydrogen, water vapor, or oxides of carbon. The time of the treatment should usually range between 30 minutes and 4 hours, preferably between 1 and 2 hours. For example, by treating carbazole with hydrogen under atmospheric or elevated pressure in the presence of an oxide or sulphide of a metal of the 6th group of the periodic system, dicyclohexyl is obtained which by the isomerization is converted into dimethyl-dicyclopentyl. By a subsequent dehydrogenation this compound is converted into dimethyldicyclopentadiene. Similarly anthracene may be converted into 9.10-dihydroanthracene which in the liquid phase at temperatures of about 350° C. in the presence of molybdenum sulphide and of hydrogen under a pressure of 200 atmospheres is simultaneously isomerized and hydrogenated to form methylfluorene-perhydride. By dehydrogenating this substance a product is obtained which is mainly composed of methylfluorene.

The polynuclear compounds may be recovered for example by cooling, precipitation, crystallization, dissolution or distillation, each of which treatments may be a fractional one, or several of these methods may be used in combination. In some cases it may be advantageous to refine the crude distillates for removing resinous constituents, as for example by treatment with concentrated sulphuric acid or with caustic alkali solution or with hydrogen under moderate conditions in the presence of refining agents, for which purpose agents having adsorbent properties may be used. The substances of high molecular weight in part often crystallize directly after this first rough separation. The further separation may be carried out by the usual methods, as for example by further distillation or crystallization, the latter being carried out if desired with the addition of precipitants or solvents, or by chemical methods, as for example fusion with caustic potash, sodium amide or alkali metals, or sulphonation.

Thus for example phenanthrene may be recovered from a fraction passing over between 325° and 345° C., anthracene from a fraction boiling between 300° and 400° C., fluorene from a fraction boiling between 295° and 320° C., or pyrene and chrysene, which may be separated from each other by means of carbon disulphide, from a fraction boiling above 390° C. By crystallization from a suitable solvent or by dissolution and precipitation, the substances may be obtained in a state of great purity. Furthermore, several of the said substances may be separated from fractions having an extended boiling point range, the single substances being separated from each other by fractional crystallization or treatment with different solvents or by dissolution and precipitation in stages with the same or different precipitants. When the compounds to be recovered do not crystallize at ordinary or reduced temperatures, the unitary substances may be recovered by fractional distillation, preferably in vacuo.

In order to isolate unitary substances which have not been deposited by cooling of the distillates, the oil freed from crystals may be treated with picric acid. The picrates thus formed may then be separated from the oil by filtration or centrifuging.

After separation of the crystallizable compounds there remain oily fractions which often yield further amounts of valuable compounds after being subjected again to dehydrogenation.

It has further been found that when storing the distillates obtained in the working up of the crude destructive hydrogenation products of bituminous substances air and oxygen should be excluded. This may be effected by storing in an inert gas, as for example nitrogen, carbon dioxide or hydrogen. It is also preferable to carry out the distillation of the product in the presence of the said gases or of water vapor. By excluding air and oxygen, the fractions remain entirely unchanged even after storage for months and allow of a simple mechanical separation of the solid substances from the oily constituents.

For the working up of the destructive hydrogenation products, one valuable method consists in diluting the destructive hydrogenation products with hydrocarbons rich in hydrogen. Thereafter, a small amount, as for example 20 per cent by weight of a dilute acid is added, for which purpose organic acids or sulphuric acid of 20 per cent strength are very suitable.

Another method consists in separating the asphalts and asphaltic substances from the destructive hydrogenation products, subjecting the separated substances to a distillation and recovering the polynuclear compounds from the distillates. The distillation of the separated asphalt or asphaltic substances is preferably effected in the most protective manner in order to avoid any decomposition of the heat-sensitive asphaltic substances, as for example by employing steam or a high vacuum or both.

In many cases it is advantageous for the recovery of valuable polynuclear compounds, especially of compounds of high molecular weight which contain for example up to about 10 rings in the molecule, to combine the method described above for the precipitation of the valuable compounds together with the asphalts and asphaltic substances, with the method involving dehydrogenation. This is effected by first adding hydrogen to the asphalt or asphaltic substances separated in the said manner by means of a careful destructive hydrogenation at the lowest possible temperature, as for example at from 300° to 400° C., and under high pressure, the resulting hydrogenation product being freed from any residual asphaltic substances still present, if desired, with an addition of refining agents as for example caustic alkalies or metallic sodium, then dehydrogenated and split up by physical or chemical methods into pure crystalline polynuclear compounds of high molecular weight.

For the complete recovery of the valuable unitary compounds from the destructive hydrogenation products it is sometimes advantageous to subject the soft asphalts and asphaltic substances, when these have been removed by the flocculation, to a distillation with scavenging gases and/or under a high vacuum, preferably in the presence of metals or condensing agents as already described, and to isolate from the distillate the unitary compounds contained therein. The asphaltic substances may, however, be subjected to a destructive hydrogenation under moderate conditions, the resulting hydrogenation product alone or together with the hydrogenation products from which the asphalt has been separated being worked up in the manner already described. The hydrogenation product obtained from the asphaltic substances may also be dehydrogenated and the unitary substances directly isolated from the dehydrogenation product.

The fractions of highest boiling point of destructive hydrogenation products of mineral coals or of mineral coal tar or their dehydrogenation products constitute tough, usually hard glassy masses which are very difficult to split up, so that the valuable unitary carbon compounds cannot be recovered therefrom by the methods hitherto known.

We have found that the pitch forming substance contained in the said masses act as agents assisting dissolution and thus prevent the recovery and especially the crystallization of the unitary compounds to a large extent, and that it is possible by the removal from the said masses of the pitch forming substances, to separate therefrom unitary carbon compounds. The removal of the substances which form pitch may be effected in the manner above described.

A specific method which is valuable especially for the treatment of initial materials containing cyclic constituents belonging at least in part to the hydroaromatic series, consists in first heating the said materials, in the present of catalysts capable of effecting an isomerization, to temperatures sufficiently high to effect isomerization, as explained in detail above, the resulting products then being subjected to dehydrogenation which in some cases may be accompanied by the splitting off of side chains from the molecules.

When polynuclear compounds having side chains are to be prepared, use is preferably made of a destructive hydrogenation as described above as suitable for this purpose, whereupon the resulting heavy oil, if desired after treatment with an adsorption agent, may be subjected to dehydrogenation in the manner described. From the resulting products, the unitary polynuclear compounds are then separated in the usual manner. The remaining oil may be added to the product consisting of oil, coal and catalyst which is withdrawn from the separator. The mixture may be centrifuged or filtered, if desired with an addition of a diluent or a small amount of an asphalt precipitant. After partly or wholly separating the solid constituents, the oil is suitable for making fresh coal into a paste.

The product from the separator, by the addition of a sufficient amount of an asphalt precipitant, may also be freed practically completely from solid constituents, asphalts and resins, the resulting oil, if desired after treatment with an adsorbent, being dehydrogenated, if desired together with the distilled heavy oil already described. The unitary compounds are then recovered from the resulting products.

It has been found to be advantageous in the process according to this modification of the present invention so to adjust the throughput of coal in the destructive hydrogenation step that while the throughput is within the limits specified above, the amount of constituents boiling above 325° C. in the destructive hydrogenation product corresponds to the amount of unitary substances to be separated. In this manner there is always present a sufficient amount of oil for making fresh coal into a paste. Alternatively, the fraction of heavy oil may be increased by increasing the throughput, the dehydrogenated oil, after removal of the polynuclear compounds, being worked up in another reaction vessel into benzene and middle oil by catalytic destructive hydrogenation.

In the aforesaid processes difficulties are sometimes encountered when it is desired to recover partly or wholly hydrogenated cyclic compounds. We have found that wholly or partly hydrogenated cyclic compounds of high molecular weight can be obtained in a simple manner from destructive hydrogenation products obtained with a great addition of hydrogen to the aromatic compounds present in the initial materials or formed during the reaction, by dehydrogenating said products or their fractions of high boiling point, separating from the resulting reaction product unitary cyclic compounds or mixtures of only a few of such compounds by physical or chemical methods and subjecting the products thus obtained to a hydrogenation to form the desired wholly or partly hydrogenated compounds. By the dehydrogation the hydro derivatives of the cyclic compounds are converted into the non-hydrogenated fundamental substances. These are then subjected to hydrogenation to form the desired hydro derivatives. This hydrogenation may be effected in known manner. For example when employing a nickel catalyst, phenanthrene may be converted into tetrahydrophenanthrene under a pressure of 90 atmospheres at 260° C., and tetrahydrophenanthrene may be converted into octohydrophenanthrene under a pressure of 87 atmospheres at 175° C.

When preparing the valuable polynuclear compounds from resins or balsams, numerous other reactions may take place or may be effected during or in connection with the destructive hydrogenation, such as isomerization of cyclohexane rings to methyl-cyclopentane rings, ring closure between aliphatic side chains or the condensation of several molecules to form highly condensed compounds. These reactions are preferably promoted by the presence of catalysts having a condensing action, as for example halogens, or the halides of aluminum, iron, zinc or magnesium, or boron fluoride.

It will be readily understood from the foregoing that it is not necessary according to the present invention to use the destructive hydrogenation exclusively for the production of valuable polynuclear compounds. It is often very advisable to combine the process in accordance with the present invention with the usual destructive hydrogenation for the production of oils for motor fuels, impregnating, lubricating and similar purposes. Of course, only such destructive hydrogenation products or fractions thereof are suitable for the purposes of the present invention as contain cyclic constituents and as have a boiling point of at least 150°, preferably at least 250° or 280° C.

Example 1

20 parts of ground gas flame coal are impregnated with an amount of hydrochloric acid sufficient to neutralize their alkalinity, dried and triturated to a paste of high consistency with 10 parts of fused soft pitch (derived from a mineral coal hydrogenation product) having a setting point of 50° C. with an addition of 1 part of ferric oxide gas purifying mass impregnated with ammonium molybdate solution, the temperature being 150° C. The paste is passed at a temperature of 150° C. through a pressure-tight reaction vessel provided with a stirrer and hydrogenated therein at 500° C. with hydrogen under a pressure of 160 atmospheres for 20 minutes. After removing the solid ash and coal constituents by centrifuging, the hydrogenation product is distilled to hard pitch with superheated steam under reduced pressure, the oil passing over above 250° C. at 50 millimeters (mercury gauge) being distilled again at the same pressure. When the fraction boiling between 250° and 280° C. at the said pressure is allowed to stand, pyrene separates in an amount of 1 per cent of the coal employed. After pressing and washing with a little benzene and pyridine it is practically pure.

Example 2

1000 parts of a brown coal producer tar which has been topped up to 300° C. are mixed with 80 parts of ferric oxide gas purifying mass which has been impregnated with a solution of 2 parts of ammonium molybdate and dried, and then treated at a temperature of 460° C. with hydrogen under a pressure of 150 atmospheres for 30 minutes. The reaction product is subjected to a careful fractionation in vacuo. When the fraction having a boiling point of from 260° to 270° C. at 50 millimeters (mercury gauge) is allowed to stand for five days at room temperature, crystals separate which after a single recrystallization from benzene constitute pure pyrene.

Example 3

100 kilograms of a distillation residue (obtained by the distillation of a destructive hydrogenation product of mineral coal up to 280° C.) having a softening point according to Krämer-Sarnow of 35° C. and containing 25 per cent of insoluble coal and ash constituents, have added thereto at 200° C. 20 kilograms of a kerosene fraction having a boiling point of from 160° to 230° C. After about one hour, 40 kilograms of hard asphalt and insoluble constituents have been deposited. The supernatant oil is withdrawn. There separate therefrom after from about 3 to 5 hourse 40 kilograms of a soft asphalt free from insoluble constituents. 40 kilograms of a mobile, red-brown oil poor in asphalt remain. The precipitant is recovered from all three fractions by blowing with steam. The soft asphalt free from insoluble constituents is distilled at 10 millimeters (mercury gauge) while employing an equal amount of superheated steam. 30 kilograms of a distillate of high boiling point are obtained. When it is allowed to stand, crystals separate therefrom which consist of chrysene, pyrene, carbazol and fluorene. The pyrene is obtained in a pure form by crystallization from benezene.

Example 4

Mineral coal tar pitch, after an addition of 3 per cent of ferric oxide gas purifying mass which is impregnated with 0.1 per cent (with reference to the pitch) of ammonium molybdate, is continually pumped through a high-pressure vessel and therein treated for 10 minutes under a hydrogen pressure of 200 atmospheres at a temperature of 470° C. The resulting reaction product is distilled with steam in vacuo. The fraction having a boiling point of from 230° to 380° C. at 50 millimeters (mercury gauge) is collected separately and dehydrogenated at a temperature of 510° C. under a hydrogen pressure of 30 atmospheres in the presence of 5 per cent of ferric oxide gas purifying mass and 0.3 per cent of nickel oxide for 5 minutes.

The dehydrogenation product is then fractionated in vacuo. The single fractions are split up into the crystallized compounds by fractional crystallization, if desired with redistillation; for example the fraction passing over between 420° and 460° C. under atmospheric pressure is dissolved in 70 per cent benzene. By cooling, almost pure crysene mixed with a little phenylnaphthyl-carbazole separates in a yield of 20 per cent of the fraction.

Example 5

Gas flame coal is prepared for destructive hydrogenation as described in Example 1 and hydrogenated at 470° C. with hydrogen under a pressure of 250 atmospheres during 20 minutes. The solid ash and coal constituents are centrifuged out from the hydrogenation product and the fraction boiling up to 280° C. is distilled off. The remaining distillation residue is stirred with 50 per cent benzine, the asphaltic substances contained therein thus being separated. The oil is then carefully fractionally distilled in vacuo. The fraction passing over between 250° and 270° C. at 50 millimeters (mercury gauge) is dehydrogenated by leading it with 40 cubic meters of air for each 100 kilograms of oil over a catalyst composed of 50 per cent of iron oxide, 20 per cent of alumina and 30 per cent of copper at 380° C. or by heating it with 20 per cent of flowers of sulphur for 2 hours at 300° C., or by leading it, as described in Example 4, over the catalyst there described at 510° C. with hydrogen under a partial pressure of 30 atmospheres. After cooling to 10° C., pyrene separates in an almost pure form from the dehydrogenated product.

Example 6

A fraction boiling between 230° and 300° C. obtained by destructive hydrogenation of mineral coal is heated to 550° C. under an initial pressure of hydrogen of 10 atmospheres (measured at room temperature) in an autoclave in the presence of a catalyst consisting of nickel sulphide and tungsten sulphide. By distilling the reaction product, a fraction boiling between 295° and 320° C. is isolated from which after cooling a product separates which consists mainly of fluorene. This is freed from oil by centrifuging and further purified by crystallization from alcohol or by way of the alkali metal compound.

When dehydrogenating a heavy oil fraction boiling above 300° C. obtained by the destructive hydrogenation of mineral coal in the same manner, distilling the dehydrogenated product until coke is formed, extracting the resinous oil boiling above 400° C. in the cold with carbon disulphide, freeing the extract from carbon disulphide and the crystallizing residue from methanol, a commercially pure pyrene is obtained. The part insoluble in carbon disulphide is extracted hot with glacial acetic acid and the extract evaporated whereby a mixture consisting of crysene and a little picene is obtained which may be separated by crystallization from glacial acetic acid or cumene.

Example 7

100 parts of mineral coal having a carbon content of 82 per cent, which have previously been treated with dilute sulphuric acid for the purpose of neutralizing the alkaline ash constituents, are triturated to a paste with 40 parts of topped mineral coal tar and 5 parts of a pulverulent catalyst composed of 98 per cent of a mixture of iron oxide and alumina and 2 per cent of molybdenum sulphide. The paste, together with 0.7 cubic meter of hydrogen per kilogram of paste, is pumped continuously through three high pressure vessels arranged one behind the other, of which the two first are kept under a pressure of 200 atmospheres at a temperature of 460° C. while the third vessel is under a pressure of 100 atmospheres and at a temperature of 510° C. In the first two vessels the adding on of hydrogen and the degradation of the coal substance into distillable oils takes place while in the third the dehydrogenation, mainly of the oil constituents of high boiling point, takes place. The distillable oils are recovered from the reaction products by steam distillation in vacuo. From the fraction which boils between 170° and 270° C. at 50 millimeters (mercury gauge) pyrene and carbazole separate after dilution with 10 per cent of ligroin and allowing to stand for three days at zero C.; the pyrene and carbazole may be separated by filtration and crystallization from an equal amount of pyridine.

The remaining oil, after removal of the ligroin, is dehydrogenated again at 550° C. under a pressure of 20 atmospheres of hydrogen and then fractionally distilled. Crystals separate from the distillate from which pure anthracene is obtained by crystallization from benzene and pyridine.

Example 8

The soft asphalt fraction obtained according to Example 3 is subjected to destructive hydrogenation at 390° C. under a pressure 230 atmospheres in the presence of an iron-molybdenum catalyst. The resulting product is freed from small amounts of asphalt by steam distillation in a high vacuum. The distillate is passed in the vaporous state together with steam at 560° C. over a catalyst consisting of zinc oxide, alumina and molybdenum oxide. The condensed reaction product has 10 per cent of picric acid dissolved therein. On cooling, a picrate separates out in the form of long red needles, from which by decomposition by means of ammonia and recrystallization from alcohol a hydrocarbon is obtained which according to analysis has the formula $C_{18}H_{13}$.

Example 9

An oil boiling above 325° C. obtained by the catalytic destructive hydrogenation of mineral coal is heated with hydrogen in a pipe coil up to 500° C. under a total pressure of 120 atmospheres; to the initial material thus heated are added 2 per cent of a catalyst which consists of brown coal small coke which has been treated with hydrochloric acid and washed and impregnated with a solution of ammonium molybdate so that it contains 2 per cent of its weight of molybdic acid, the mixture then being led continuously through the reaction chamber maintained at the same conditions of temperature and pressure. The resulting product is cooled, the pressure released, the catalyst centrifuged off and the remainder carefully fractionally distilled. The fraction boiling up to 200° C. contains a high percentage of aromatic hydrocarbons, as for example toluene and xylene. From the fraction boiling between 200° and 275° C. about 15 per cent of crude naphthalene are obtained on standing. The fraction boiling between 275° and 380° C. yields on standing about 25 per cent of crude anthracene. The crude anthracene is split up by crystallization from alcohol into pure anthracene, phenanthrene, acenaphthene and methylated naphthalenes. The oil freed from crude anthracene yields, by fusion with caustic potash, about 15 per cent of fluorene. The residue boiling above 380° C. is distilled to coke, about 20 per cent of coke remaining. From the distillate about 35 per cent of pyrene are obtained by extraction with carbon disulphide while about 5 per cent of chrysene is dissolved out from the remaining oil by glacial acetic acid. The remaining oil fractions freed from solid aromatic hydrocarbons may be dehydrogenated again.

Example 10

A sludgy residue derived from the destructive hydrogenation of mineral coal is freed from solid constituents by centrifuging, if desired freed from asphalt by means of illuminating oil, and then heated to 280° C. in a preheater. After this preheating, the mass is led into a reaction chamber charged with a catalyst of molybdenum, zinc and magnesium, in which a temperature of 500° C., a pressure of hydrogen of from 30 to 40 millimeters and a total pressure of 70 millimeters (mercury gauge) are maintained. The throughput amounts to 0.15 kilogram of oil per liter of furnace volume per hour. The resulting dehydrogenation product is fractionally condensed in a separator which is also under a reduced pressure of hydrogen. After allowing the fractions to stand for a considerable time, about 20 per cent of crystals separate consisting mainly of pyrene, chrysene, anthracene, acenaphthene, naphthanthracene, picene and methylnaphthalenes, which are separated from the mother liquor by pressing and purified by fractional crystallization from mixtures of alcohol and benzene. By adding picric acid solution to the mother liquor, about 5 per cent of crystalline compounds are obtained in the form of picrates which may be decomposed with ammonia to form hydrocarbons which may be separated from each other by fractional crystallization.

Example 11

An oil obtained by destructive hydrogenation of mineral coal at 460° C. under a pressure of 250 atmospheres in the presence of a catalyst containing molybdenum is distilled at a pressure of 15 millimeters (mercury gauge) and the fraction boiling from 180° to 325° C. is isolated. This fraction contains 2 per cent of crystallizable substances which are separated by dilution with a mixture of ether and alcohol and cooling to 50° below zero C.

The remainder of the said fraction together with 0.15 per cent of carbon tetrachloride is heated to 510° C. under a pressure of 50 atmospheres. After the whole has reached the reaction temperature, 0.4 per cent of iron powder is added. The mixture is then allowed to remain at the reaction temperature for ten minutes. The reaction product obtained contains 14 per cent of crystallizable cyclic compounds, mainly crude pyrene, and about 12 per cent of constituents boiling above 325° C. in vacuo.

Example 12

A fraction, boiling above 325° C., of an oil obtained by the destructive hydrogenation of coal is treated at 80° C. with three times its amount of propane. The asphalt precipitated is separated from the oil solution. The oil, freed from propane, is then treated for from four to five hours in a Siemens ozone tube at a temperature of 70° C. under a pressure of 7 millimeters (mercury gauge) with silent electric discharges of 7000 volts and 10,000 periods. The reaction product is then diluted with benzine in the ratio of 1:1 and filtered to separate small amounts of insoluble polymerization products. The filtrate is freed from benzine by distillation and then split up by distillation in vacuo into fractions of narrow boiling point range, as for example fractions each having a boiling point range of 10° C. The single fractions are then diluted with a mixture of ether and alcohol and cooled to 40° below zero C., a high yield of solid crystallized aromatic hydrocarbons, especially crude pyrene from the fraction boiling at 320° to 400° C. thus being obtained.

Example 13

The fraction boiling above 350° C. of a product obtained by the destructive hydrogenation of mineral coal is freed from solid constituents and hard and soft asphalts by distillation in vacuo. The oil distillate thus obtained in a yield of 80 per cent is diluted with twice its volume of methyl formate, cooled to 3° below zero C. and freed by filtration from the paraffin wax which has separated in an amount of 3 per cent. The dewaxed oil is then freed from solvent by distillation and washed with caustic soda solution of from 5 to 10 per cent strength, the acid constituents thus being dissolved out in an amount of about 3 per cent. The basic constituents are then removed in an amount of 2 per cent by washing with sulphuric acid of from 5 to 10 per cent strength. The oil thus pretreated is fractionally distilled in a vacuum of 1 millimeter (mercury gauge) with 1 per cent of metallic sodium. From the fractions there are obtained in a yield of about 7 per cent crystallized substances consisting mainly of carbazole, anthracene, pyrene, and chrysene. The oil separated from the crystallized substances is led at 550° C. in an atmosphere of hydrogen under a pressure of 40 millimeters (mercury gauge) over a catalyst consisting of nickel sulphide and molybdenum sulphide, dehydrogenation thus being effected. The oil obtained is split up by distillation into several fractions from which fluoranthene, pyrene, chrysene, retene, picene and other cyclic compounds crystallize in a yield of 5 per cent. If the dewaxed oil is freed from solvent by distillation and subjected to fractional vacuum distillation with an addition of 8 per cent of aluminum chloride, there are obtained from the fractions in a yield of about 7 per cent crystallized substances which consist mainly of carbazole, anthracene, pyrene and chrysene. The oil separated from the crystallized substances is led in an atmosphere of hydrogen at 550° C. under a pressure of 20 atmospheres over a catalyst consisting of nickel sulphide and molybdenum sulphide, whereby dehydrogenation takes place. The oil thus obtained is split up by distillation into several fractions from which cyclic compounds, mainly crude pyrene, crystallize in a yield of 5 per cent.

Example 14

The fraction boiling above 300° C. of a destructive hydrogenation product of mineral coal is led at 550° C. at atmospheric pressure in the presence of hydrogen over a catalyst consisting of nickel sulphide and molybdenum sulphide. The dehydrogenation product thus obtained is distilled. The fraction boiling above 400° C. constitutes a tough glassy mass. 100 parts of this mass are heated to 80° C. while stirring under a reflux condenser with 12 per cent of heavy benzine or 8 per cent of benzene and with 5 per cent of fuller's earth for half an hour, the fuller's earth with the adsorbed and partly polymerized resinous substance being filtered off. A filtrate is obtained from which after removing the solvent 30 parts of a crystal pulp separate. By extraction of the crystal pulp with alcohol 15 parts of crude pyrene are obtained therefrom and by subsequent extraction with glacial acetic acid 5 parts of chrysene are obtained which may be purified by crystallization as such or by way of the picrate. By extracting the extraction residue with an equal amount of toluene at 40° C., chrysogen is obtained. The oily residue (60 parts) separated from the crystal pulp is boiled with xylene, the mixture cooled at 20° C. and the liquid poured off at the said temperature from the undissolved portion. The solvent is distilled off from the xylene solution or the solution is cooled to zero C. or lower, whereby 3 parts of a crystallized hydrocarbon having a green fluorescence are obtained the empirical formula of which is $C_{36}H_{22}$ and the melting point of which is 308° C. A determination of the molecular weight yields a value of about 430.

A similar effect is obtained when the fraction of high boiling point to which 70 per cent of a mineral coal tar fraction boiling between 150° and 220° C. has been added, is treated at 80° C. with 10 per cent of 60 per cent sulphuric acid, then freed from acid tar, washed with 5 per cent of 10 per cent caustic soda solution and extracted in the manner already described.

*Example 15*

The fraction boiling above 300° C. of a destructive hydrogenation product of mineral coal having an asphalt content of 7 per cent is mixed with three times its amount of a benzine containing 14 parts of hydrogen for each 100 parts of carbon and boiling between 40° and 150° C. The precipitated asphaltic constituents are separated and the solution freed from benzine by distillation. The oil is then heated to 320° C. together with hydrogen under a pressure of 250 atmospheres and led over a catalyst consisting of tungsten sulphide. The reaction product thus obtained is practically free from unsaturated hydrocarbons and to a great extent free from compounds containing sulphur and oxygen. This product is then led together with hydrogen under a pressure of 50 atmospheres at 490° C. over a catalyst consisting of cobalt sulphide and tungsten sulphide. The reaction product obtained is then split up into fractions from which by cooling crystalline cyclic compounds are separated, such as fluoranthene, pyrene, chrysene, anthracene and picene.

*Example 16*

Ruhr mineral coal is finely ground and made into a paste in the ratio of 1:1 with a heavy oil obtained from the same coal by destructive hydrogenation. The coal paste is mixed with 1 per cent of finely ground tin oxalate and 0.85 per cent of carbon tetrachloride. This mixture is then led together with hydrogen under a pressure of 200 atmospheres through a gas-heated pipe system in which it is heated to 425° C. Before entry into the reaction chamber, 1 per cent of tin oxalate, suspended in a finely ground form in heavy oil, is added to the mixture. The throughput is 0.23 kilogram of coal paste per liter of reaction space per hour. The reaction materials then pass into a separator heated to 415° C. in which a definite level of liquid is maintained. The gases and vapors pass into an adjacent stripping vessel.

The degradation of the carbon of the coal amounts to 93 per cent, the gasification is 11.5 per cent, calculated with reference to the oil formed from the coal and the gaseous constituents, and the asphalt content of the heavy oil leaving the reaction chamber is 3 per cent. The product collecting in the stripping vessel consists of 50 per cent of constituents boiling up to 325° C. These are removed by distillation. The residue is then refined with dilute sulphuric acid in the presence of 1 per cent of fuller's earth. The residue thus freed from resin is then split up in vacuo into several fractions from which pyrene, phenanthrene, anthracene, fluorene and methylanthracene, dimethylanthracene, methylnaphthalene, dimethylnaphthalene and methyl fluorene are recovered by cooling. The oils freed from unitary compounds obtained from the single fractions are united and added to the product withdrawn from the separator, consisting of oil fractions of high boiling point and coal particles. This product is centrifuged and the resulting oil is employed for making fresh coal into a paste.

The distillation residue from the stripping vessel product may also be mixed with the product withdrawn from the separator and the mixture centrifuged. The centrifuged oil is then mixed with hydrocarbons rich in hydrogen so that the asphalt and small amounts of solid substances are precipitated. The oil free from asphalt is separated as already described, refined with sulphuric acid and fuller's earth and then split up into fractions from which the said unitary cyclic compounds are removed.

The oil freed from the said substances is employed for making fresh coal into a paste.

*Example 17*

Finely ground mineral coal is impregnated with an amount of hydrochloric acid sufficient to neutralize the alkalinity of its ash and then with ammonium molybdate. The coal thus pretreated is then mixed in the ratio of 1:1 with a heavy oil obtained from the said coal by destructive hydrogenation. The resulting paste is treated at 475° C. with hydrogen under a pressure of 200 atmospheres. The ash and coal constituents are separated from the reaction product by centrifuging and the fractions of low boiling point distilled off. The distillation residue is stirred with 50 per cent of benzine and the asphalt which flocculates separated.

The oil free from asphalt is then split up into fractions and the latter are led in an atmosphere of hydrogen at a pressure of 40 millimeters (mercury gauge) over molybdenum sulphide at 550° C., whereby dehydrogenation takes place. Acenaphthene, anthracene, pyrene, and chrysene may be separated from the dehydrogenation product. The acenaphthene is introduced into an autoclave together with 8 per cent of nickel which has been obtained by the reduction of nickel nitrate. With a temperature of 270° C. and an initial pressure of hydrogen of 95 atmospheres, tetrahydroacenaphthene is obtained.

Similarly hexahydropyrene is obtained from pyrene at 300° C. under an initial pressure of hydrogen of 80 atmospheres. The hexahydropyrene may be converted into decahydropyrene at 210° C. under an initial pressure of hydrogen of 90 atmospheres.

*Example 18*

Colophony is treated for 2 hours at 380° C. with hydrogen under a pressure of 250 atmospheres in the presence of 10 per cent of a catalyst consisting of aluminum oxide and nickel oxide. The liquid reaction product is fractionated under a pressure of 50 millimeters (mercury gauge). The main fraction passing over between 260° and 300° C. is led at 450° C. under a partial pressure of hydrogen of 20 atmospheres over aluminum oxide. The resulting product is fractionated in vacuo by means of a column. Methylisopropylphenanthrene separates in a crystalline form from that fraction which would boil between 380° and 400° C. at 760 millimeters of mercury.

This application is a division of our copending application Ser. No. 751,251 filed November 2, 1934.

What we claim is:

1. The process of producing polynuclear carbon compounds containing at least four nuclei, which comprises subjecting a bituminous material, other than mineral coal high temperature tar, to a temperature of about 200° C. to 700° C. and a pressure of at least 20 atmospheres in the presence of hydrogen to effect at least a substantial hydrogenation of said bituminous material and the formation of substantial and recoverable amounts of said carbon compounds, and recovering said carbon compounds from a fraction of the resulting product which contains substantial amounts of substances selected from the group consisting of said polynuclear carbon compounds and their hydro derivatives.

2. The process of producing polynuclear carbon compounds containing at least four nuclei and polynuclear carbon compounds containing less than four nuclei, but containing side chains which comprises subjecting a bituminous material to a temperature of about 200° C. to 700° C. and a pressure of at least 20 atmospheres in the presence of hydrogen to effect at least a substantial hydrogenation of said bituminous material and the formation of substantial and recoverable amounts of said carbon compounds, subjecting a product from said hydrogenation treatment which contains substantial amounts of substances selected from the group consisting of said polynuclear carbon compounds and their hydro derivatives to dehydrogenation, and recovering said carbon compounds from the resulting products.

3. The process of producing polynuclear carbon compounds which comprises subjecting a bituminous material to a temperature of about 200° C. to 700° C. and a pressure of at least 20 atmospheres in the presence of hydrogen to effect at least a substantial hydrogenation of said bituminous material and the formation of substantial and recoverable amounts of said carbon compounds, subjecting a product from said hydrogenation treatment which contains substantial amounts of substances selected from the group consisting of said polynuclear carbon compounds and their hydro derivatives to dehydrogenation by heating to a reaction temperature in vacuo in the presence of a dehydrogenation catalyst, and recovering said carbon compounds from the resulting products.

4. The process of producing polynuclear carbon compounds which comprises subjecting a bituminous material to a temperature of about 200° C. to 700° C. and a pressure of at least 20 atmospheres in the presence of hydrogen to effect at least a substantial hydrogenation of said bituminous material and the formation of substantial and recoverable amounts of said carbon compounds, subjecting a product from said hydrogenation treatment which contains substantial amounts of substances selected from the group consisting of said polynuclear carbon compounds and their hydro derivatives to dehydrogenation by heating to a reaction temperature in the presence of a dehydrogenation catalyst, and of an acid substance, and recovering said carbon compounds from the resulting products.

5. The process of producing polynuclear carbon compounds containing at least four nuclei and polynuclear carbon compounds containing less than four nuclei, but containing side chains which comprises subjecting a bituminous material to a temperature of about 200° C. to 700° C. and a pressure of at least 20 atmospheres in the presence of hydrogen to effect at least a substantial hydrogenation of said bituminous material and the formation of substantial and recoverable amounts of said carbon compounds, freeing a product from said hydrogenation treatment which contains substantial amounts of substances selected from the group consisting of said polynuclear carbon compounds and their hydro derivatives at least partly from asphaltic substances, and subjecting the thus pretreated product to distillation with an addition of a substance from the class consisting of metals and condensing and polymerizing agents, and recovering the carbon compounds from the resulting products.

6. The process of producing polynuclear carbon compounds which comprises subjecting a bituminous material to a temperature of about 200° C. to 700° C. and a pressure of at least 20 atmospheres in the presence of hydrogen to effect at least a substantial hydrogenation of said bituminous material, and the formation of substantial and recoverable amounts of said carbon compounds, subjecting a product from said hydrogenation treatment which contains substantial amounts of substances selected from the group consisting of said polynuclear carbon compounds and their hydro derivatives to dehydrogenation, freeing the resulting product at least partly from asphaltic substances, subjecting the thus pretreated product to distillation with an addition of a substance from the class consisting of finely divided metals and of condensing and polymerizing agents, and recovering the carbon compounds from the resulting products.

7. The process of producing polynuclear carbon compounds which comprises subjecting a bituminous material to a temperature of about 200° C. to 700° C. and a pressure of at least 20 atmospheres in the presence of hydrogen to effect at least a substantial hydrogenation of said bituminous material and the formation of substantial and recoverable amounts of said carbon compounds, freeing a product from said hydrogenation treatment which contains substantial amounts of substances selected from the group consisting of said polynuclear carbon compounds and their hydroderivatives at least partly from asphaltic substances, subjecting the thus pretreated product to distillation with an addition of a substance from the class consisting of metals and condensing and polymerizing agents, subjecting the product thus obtained to dehydrogenation, and recovering said carbon compounds from the resulting products.

8. The process of producing polynuclear carbon compounds which comprises subjecting a bituminous material to a temperature of about 200° C. to 700° C. and a pressure of at least 20 atmospheres in the presence of hydrogen to effect at least a substantial hydrogenation of said bituminous material and the formation of substantial and recoverable amounts of said carbon compounds, freeing a product from said hydrogenation treatment which contains substantial amounts of substances selected from the group consisting of said polynuclear carbon compounds and their hydro derivatives at least partly from asphaltic substances, acting upon the thus pretreated product with a condensing agent at a temperature between ordinary room temperature and 150° C., subjecting the treated product to distillation, and recovering said carbon compounds from the resulting products.

9. The process of producing polynuclear carbon compounds which comprises subjecting a material selected from the group consisting of recent and fossil resins and balsams and products containing the same to a temperature of about 200° C. to 700° C. and a pressure of at least 20 atmospheres in the presence of hydrogen to effect at least a substantial hydrogenation of said material and the formation of substantial and recoverable amounts of said carbon compounds, dehydrogenating the resulting product, and recovering said carbon compounds from a fraction of the resulting product which contains substantial amounts of substances selected from the group consisting of said polynuclear carbon compounds and their hydro derivatives.

10. As a new substance, a hydrocarbon having a green fluorescence, melting at 308° C., of which the empirical formula is $C_{36}H_{22}$ and determination of the molecular weight yields a value of about 430.

11. The process as defined in claim 3, wherein the catalyst is a finely divided metal dehydrogenation catalyst.

12. The process as defined in claim 1, wherein the treatment at a temperature of about 200 to 700° C. results in the formation of products containing asphaltic substances and wherein the asphaltic substances are removed prior to the recovery of the polynuclear carbon compounds and their hydro derivatives.

13. The process as defined in claim 1, wherein the product resulting from the treatment at a temperature of about 200 to 700° C. contains paraffine wax and asphaltic substances and wherein said product is freed from the paraffine wax and at least partly from the asphaltic substances prior to the recovery of the polynuclear carbon compounds and their hydro derivatives.

14. The process as defined in claim 1, wherein the product obtained by the treatment at a temperature of about 200 to 700° C. contains pitch-forming constituents and wherein said constituents are removed prior to the recovery of the polynuclear carbon compounds and their hydro derivatives.

15. The process as defined in claim 2, wherein the product obtained by the heat treatment at a temperature of about 200 to 700° C. contains paraffine wax and asphaltic substances and wherein said product is freed from said paraffine wax and at least partly from said asphaltic substances prior to the dehydrogenation treatment.

16. The process as defined in claim 2, wherein the product from the dehyrogenation treatment is freed from pitch-forming constituents prior to the recovery of the polynuclear carbon compounds.

17. The process of producing polynuclear carbon compounds which comprises subjecting a bituminous material to a temperature of about 200 to 700° C. and a pressure of at least 20 atmospheres in the presence of hydrogen to effect at least a substantial hydrogenation of said bituminous material and the formation of substantial and recoverable amounts of said carbon compounds, subjecting the product to dehydrogenation, removing from a fraction of said product which contains asphalt at least the hard asphalt, subjecting the resulting product to a destructive hydrogenation under predominantly hydrogenating conditons and recovering the polynuclear carbon compounds from the resulting product.

18. The process as defined in claim 17, wherein a dehydrogenation is interpolated between the destructive hydrogenation and the recovery of said carbon compounds.

19. The process as defined in claim 17, wherein the liquid remaining after the recovery of said polynuclear carbon compounds is subjected to a dehydrogenation and wherein further amounts of said polynuclear carbon compounds are recovered from the resulting product.

MATHIAS PIER.
KARL SCHOENEMANN.